Patented Apr. 10, 1923.

1,451,357

UNITED STATES PATENT OFFICE.

THOMAS B. ALDRICH, OF DETROIT, MICHIGAN, ASSIGNOR TO PARKE, DAVIS & COMPANY, OF DETROIT, MICHIGAN, A CORPORATION OF MICHIGAN.

NITROBENZOIC ACID ESTERS OF TRIHALOGENTERTIARY BUTYL ALCOHOL.

No Drawing.   Application filed April 10, 1922. Serial No. 551,267.

*To all whom it may concern:*

Be it known that I, THOMAS B. ALDRICH, a citizen of the United States of America, residing at Detroit, in the county of Wayne and State of Michigan, have invented certain new and useful Nitrobenzoic Acid Esters of Trihalogentertiary Butyl Alcohol, of which the following is a specification.

The invention relates to a new series of bodies which may be designated as nitro benzoic esters of tri-halogentertiary-butyl-alcohol. I have isolated a number of specific bodies belonging to this series, some of which are isomeric and others differing by the specific halogen used in the compound. As an example of this new series I shall describe several methods of preparation of one of the series, viz. the meta nitro benzoic ester of tri-chlorotertiary-butyl-alcohol.

One method of preparation of meta nitro benzoic ester of tri-chlorotertiary-butyl-alcohol is to combine meta nitro benzoyl chloride with tri-chlorotertiary-butyl-alcohol according to the following reaction:—

(A)

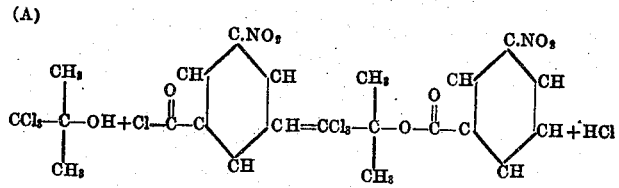

Place 10 grams of tri-chlorotertiary-butyl-alcohol in suitable flask with condenser attachment of glass and add 10 grams of meta nitro benzoyl chloride. Solution results on warming gently. Continue to heat over a free flame using a gauze until there is an evolution of gas (HCl). Continue the heating whenever the evolution of gas slackens. After heating for half an hour or so over a free flame, remove the flask to a steam bath and heat several hours longer or until very little gas is given off.

On cooling the mass solidifies. Add water and reheat on steam bath. Cool and decant the wash water. Continue the washing until the water is no longer acid. Allow to solidify, decant the last wash water, and dissolve the ester in alcohol. Place flask in ice water, the ester is deposited in the form of crystals. Dry crystals at room temperature. Repeated crystallization gives a product melting at 86–88° C. approximately.

Another method of producing the same compound is the nitration of the benzoic acid ester of the tri-chlorotertiary-butyl-alcohol:—

(B)

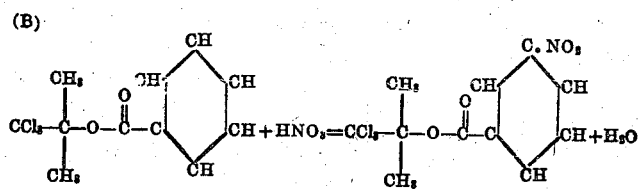

Place 100 grams (or 71.4 cc.) of nitric acid (sp. g. 1.4) in a suitable flask and holding the temperature under 50–60° C. add 50 grams of the finely powdered benzoic ester, stirring briskly during the addition. A yellowish liquid results which may be allowed to stand for a number of hours.

Add an excess of water, cooling at the same time. A yellowish oil is thrown out which gradually solidifies. Remove to a mortar and grind up with excess of cold water several times. Collect on a filter and re-crystallize repeatedly from 95% alcohol. The resulting product has a melting point of about 86–88° C. and is identical in every respect with the compound obtained under method A. The yield obtained from this method is about 50%.

The formula of meta nitro benzoic acid ester of tri-chlorotertiary-butyl-alcohol may be graphically represented as follows:—

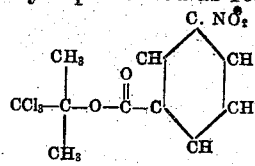

By using the isomeric mono nitro benzoyl chloride compounds, such as the ortho and para compounds and using method A, the corresponding ortho and para nitro benzoic acid esters of tri-chlorotertiary-butyl-alcohol may be similarly prepared.

Three other compounds may be prepared by using tri-bromotertiary-butyl-alcohol and the three isomeric mono nitro benzoyl chlorides compounds and method A. I have prepared all of these compounds which may be designated as follows:—

Meta nitro benzoic acid ester of tri-bromotertiary-butyl-alcohol.

Ortho nitro benzoic acid ester of tri-bromotertiary-butyl-alcohol.

Para nitro benzoic acid ester of tri-bromotertiary-butyl-alcohol.

The following properties are common to all of the above mentioned nitro compounds. They are crystalline and practically insoluble in water, but soluble in the organic solvents and are stable to light and ordinary atmospheric conditions.

The specific properties of some of the compounds of this new series are as follows:—

*Meta nitro benzoic acid ester of tri-chlorotertiary-butyl-alcohol.*

Crystallizes from alcohol in white plates. Melting point (uncorrected) 86–88° C.
Chlorine determinations (Carius) gave the following results:
Sub. 0.3164, 0.2732: AgCl 0.4145; 0.359.
Cal. for $C_{11}H_{10}O_4NCl_3$: 32.6. Found: 32.4, 32.5.

Readily soluble in hot alcohol, crystallizing on cooling.
Very soluble in chloroform, acetone, ether. Insoluble in water.

*Para nitro benzoic acid ester of tri-chlorotertiary-butyl-alcohol.*

Crystallizes from alcohol in flat colorless needles.
Melting point (uncorrected) 145° C.
Chlorine determinations:
Sub. 0.2414, 0.2293, 0.2605, 0.3385: AgCl 0.3176: 0.3075: 0.3400: 0.4472.
Cal. for $C_{11}H_{10}O_4NCl_3$: 32.6. Found: 32.55: 33.17: 32.29: 32.68.

Sparingly soluble in cold alcohol. In alcohol heated to 70° C. it is soluble to the extent of 5%. Soluble in ether to the extent of 5%. Very soluble in chloroform. Insoluble in water.

*Ortho nitro benzoic acid ester of tri-chlorotertiary-butyl-alcohol.*

Not very soluble in cold alcohol. Readily soluble, however, in hot alcohol from which it crystallizes in beautiful crystals. Melting point (uncorrected) 91° C.

Chlorine determinations:
Sub. 0.2782: 0.2520; 0.3490: 0.3159: AgCl 0.3613: 0.3270: 0.4523.
Cal. for $C_{11}H_{10}O_4NCl_3$, 32.6: found, 32.1, 32.06, 32.29.

*Meta nitro benzoic acid ester of tri-bromotertiary-butyl-alcohol.*

Sparingly soluble in cold alcohol. May be dissolved in hot alcohol from which it crystallizes in the form of needle-like prisms. Exceedingly soluble in chloroform, soluble in ether, acetone, glacial acetic acid. Insoluble in water.
Melting point (uncorrected) 121° C.
Bromine determinations (Carius).
Subs. 0.2807; 0.3605: AgBr, 0.3430: 0.4420.
Calc. for $C_{11}H_{10}O_4NBr_3$: 52.17. Found: 52.01, 52.14.

*Para nitro benzoic acid ester of tri-bromotertiary-butyl-alcohol.*

Sparingly soluble in cold alcohol. May be dissolved in hot alcohol from which it crystallizes in the form of fine needles. Exceedingly soluble in chloroform, soluble in ether, acetone, glacial acetic acid. Insoluble in water. Melting point (uncorrected) 148° C.
Bromine determination.
Subs. 0.3001, 0.2961: AgBr, 0.3662, 0.3630.
Calc. for $C_{11}H_{10}O_4NBr_3$: 52.17. Found: 51.92: 52.18.

*Ortho nitro benzoic acid ester of tri-bromotertiary-butyl-alcohol.*

Sparingly soluble in cold alcohol. May be dissolved in hot alcohol from which it crystallizes in the form of plates similar to those of meta nitro benzoic acid ester of tri-chlorotertiary-butyl-alcohol. Very soluble in chloroform, ether, acetone. Soluble in glacial acetic acid. Insoluble in water. Melting points (uncorrected) 97° C.
Subs., 0.26666, 0.3107, 0.2591, 0.2415: AgBr, 0.3208, 0.3759, 0.3111, 0.2945.
Calc. for $C_{11}H_{10}O_4NBr_3$: 52.17. Found: 51.2, 51.48, 51.1, 51.43.

Although it is generally more convenient to prepare the nitro esters by using the respective nitro benzoyl chlorides, other processes may be used, such as treating the respective nitro benzoic acids with tri-halogentertiary-butyl-alcohol and using suitable dehydrating agents.

What I claim as my invention is:—

1. A new body forming one of a series which may be designated as nitro derivatives of the benzoic acid esters of tri-halogentertiary-butyl-alcohol, said body having the following characteristics: insolubility in water, solubility in organic solvents, crystalline form and stability under ordinary conditions.

2. A new body forming one of a series which may be designated as nitro benzoic acid esters of tri-chlorotertiary-butyl-alcohol, said body having the following characteristics; insolubility in water, solubility in organic solvents, crystalline form and stability under ordinary conditions.

3. A new body forming one of a series which may be designated as mono nitro benzoic acid esters of tri-halogentertiary-butyl-alcohol, said body having the following characteristics; insolubility in water, solubility in organic solvents, crystalline form and stability under ordinary conditions.

4. A new body forming one of a series which may be designated as mono nitro benzoic acid esters of tri-chlorotertiary-butyl-alcohol, said body having the following characteristics; insolubility in water, solubility in organic solvents, crystalline form and stability under ordinary conditions.

5. The new body meta nitro benzoic acid ester of tri-chlorotertiary-butyl-alcohol having the following characteristics: crystallizes from alcohol in white plates having a melting point of about 86–88° C., readily soluble in hot alcohol, crystallizing on cooling, very soluble in chloroform, acetone and ether, insoluble in water containing about 32.06% chlorine.

In testimony whereof I affix my signature.
THOMAS B. ALDRICH.